US006415996B1

United States Patent
Adair et al.

(10) Patent No.: US 6,415,996 B1
(45) Date of Patent: Jul. 9, 2002

(54) DYNAMIC CONTROL AND ENHANCED CHEMICAL MILLING OF CERAMICS TO SUBMICRON PARTICLE SIZES

(75) Inventors: James H. Adair, State College; Thomas R. Shrout, Port Matilda; Gary L. Messing, State College; Tarah M. Pecora, Pgh; Michael M. Mandanas, State College, all of PA (US)

(73) Assignee: The Penn State Research Foundation, University Park, PA (US)

( * ) Notice: Subject to any disclaimer, the term of this patent is extended or adjusted under 35 U.S.C. 154(b) by 30 days.

(21) Appl. No.: 09/688,630

(22) Filed: Oct. 16, 2000

(51) Int. Cl.⁷ ................................................ B02C 19/00
(52) U.S. Cl. ............................................ 241/16; 241/21
(58) Field of Search ................................ 501/134, 136, 501/137; 241/16, 21, 172

(56) References Cited

U.S. PATENT DOCUMENTS

| | | | |
|---|---|---|---|
| 4,939,108 A | | 7/1990 | Dean |
| 4,968,460 A | | 11/1990 | Thompson |
| 5,098,740 A | * | 3/1992 | Tewari .................... 106/1.05 |
| 5,362,472 A | | 11/1994 | Lauter et al. |
| 5,656,219 A | * | 8/1997 | Riedel et al. ............... 264/666 |
| 6,214,756 B1 | * | 4/2001 | Adair et al. ............... 423/598 |

FOREIGN PATENT DOCUMENTS

WO    WO 96/06811   *  3/1996

OTHER PUBLICATIONS

Reed, *Introduction to the Principles of Ceramic Processing*, John Wiley & Sons, Inc., NY, pp. 132–184, 395–400 (1988).

D.A. Anderson, et al., Surface Chemistry Effects on Ceramic Processing . . . *Cer. Trans.*, Ceramic Power Science, vol. 1, The American Ceramic Society, Inc., Ohio, 1988, 485–492.

D.E. Niesz, et al., "Structure and Properties of Aglomerates", pp. 61–73 in *Ceramic Processing Before Firing*, G.Y. Onoda., and L.L. Hench (eds.), Wiley & Sons, NY 1978.

* cited by examiner

*Primary Examiner*—Mark Rosenbaum
(74) *Attorney, Agent, or Firm*—McKee, Voorhees & Sease, P.L.C.

(57) ABSTRACT

Chemically aided milling of ceramic powders is disclosed. Carrier suspension, usually aqueous, of the ceramic powder may have added to it a dispersing agent and a passivating agent, followed by milling the aqueous suspension while continuously monitoring the pH, and as necessary, adding acid or a base to keep the pH within a desired range during milling. Real time monitoring allows milling with lower energy consumption, and enhances the desirable particle surfaces of the ceramic powder. The passivating agent can also be real time monitored and adjusted as necessary.

18 Claims, 3 Drawing Sheets

DYNAMIC CONTROL AND ENHANCED CHEMICAL MILLING OF CERAMICS TO SUBMICRON PARTICLE SIZES

FIELD OF THE INVENTION

The present invention pertains to milling of ceramic powders and an improved process for the same.

BACKGROUND OF THE INVENTION

Ceramic powders are important in a variety of different fields. Examples include manganese zinc ferrites, aluminum nitride, zinc oxide, silicon dioxide, barium titanate, and iron oxide.

Manganese zinc ferrites ($(Mn,Zn,Fe)Fe_2O_4$ or MZF) are important ceramic materials for the manufacture of ferromagnetic devices including inductors and transformers. Conventionally, commercial MZF are prepared through calcination of mixtures of the single component precursor metal carbonates or oxides followed by milling to the desired particle size range. The milling operation usually involves suspension of the calcined, aggregated material in water to promote a higher milling efficiency than that encountered with dry milling. Aluminum nitride ($AlN_3$) is commonly used in circuit substrates. Zinc oxide is used as a varistor material, and, of course, uses for silicon dioxide ceramics are ubiquitous. Barium titanate is often used in multi-layer capacitors and in piezoelectric devices such as transducers and ultrasonic vibrators.

Each of these ceramics presents its own characteristic problems when attempts are made to deposit those at a fine micron particle size level for their common ceramic uses as above-mentioned. For example, manganese zinc iron ferrite is often made by mixing a precursor mix of magnesium carbonate, zinc carbonate, iron oxide, which is then calcined at about 1000° C. The chemicals "homogenize" during the calcination process at the high temperature, but this results in primary particles which have sintered. Aluminum nitrides, as commercially prepared, often result in a polycrystalline aggregate which is made by chemical vapor deposition, but to be useful, the aggregate needs to be broken up, i.e., milled. Zinc oxide ceramic typically comes from calcining a mixture of zinc hydroxide and zinc carbonate or the single precursors, and the resultant product, too, needs milling to be useful. Silicon dioxide, as commercially provided, comes from chemical vapor deposition, but while it is very fine, it often aggregates in the process, and therefore also needs milling. Barium titanate is prepared by calcining either $BaCO_3$ and $TiO_2$ or a precursor such as $(BaTiO)(C_2O_4)_2 \cdot 4H_2O$, which results in polycrystalline aggregates. All are in need of further treatment to make satisfactory submicron particles for their various ceramic material uses.

As an example, the importance of being able to produce thinner dielectric layers is becoming increasingly recognized by the producers of multilayer capacitors (MLC's) due to end user requirements of reduced size and cost. These capacitors are typically manufactured by co-firing, i.e., sintering alternating multilayers of the ceramic dielectric formulation and a conductive electrode material in a controlled atmosphere at a temperature in the range of about 1000° to 1400° C.

Dielectric layers have traditionally been produced by preparing a suspension of ceramic powder in a liquid vehicle, usually containing a dispersant, and then adding an organic resin matrix which functions to bind the ceramic particles after tape formation and drying. A variety of methods are known for applying the suspension and binder mixture (hereafter defined as slip) to a substrate to form very thin layers of the suspended solids. Methods such as wet coating, tape-casting (casting), or doctor-blading are readily known to those skilled in the art. The thin, dried layers generally termed as green layers, may then be coated with conductive electrodes and stacked together with similar layers to form a green body. The stack is then trimmed and co-fired to produce a structure consisting of alternating layers of sintered electrode and dielectric which is finally leaded with end terminations to form the finished capacitor. Suspensions used for dielectric compositions in the past have used both aqueous and organic liquids, but because of the environmental and safety concerns, the tendency of late has been to increase the use of aqueous suspensions, which are therefore preferred.

Another trend in the capacitor industry has been to make the dielectric layers thinner to obtain more capacitance per unit volume. Therefore, the thickness of dielectric layers has been reduced, e.g., from 25 microns to 10 microns. It is now desirable to reduce the thickness even less to, for example, 5 microns or less. These thinner layers necessitate the use of extremely small solid ceramic particles in the suspension to produce the required high density and fine grain size in the final fired layer. When ceramic powders are reduced to such small particle sizes, i.e., less than 0.5 microns, they tend to have a significant soluble portion that dissolves in an aqueous suspension, thus causing chemical reactions with the dispersants and binders in solution which may create process problems.

Then too, ever smaller particles are also more difficult to handle, making automated systems unduly complex and expensive.

Barium titanate, the base material of choice for capacitor formulations due to its dielectric characteristics, forms a soluble barium cation in aqueous conditions. The organic additive typically used in the processing contains chemical groups that can react with the soluble cation or its companion hydroxyl ion. Agglomerates of polymer and phase separation or "salting out" or precipitation of the metal cation organic complex can take place. These complexes or agglomerates often create voids in the ceramic body during the binder burnout phase prior to sintering and can result in either elevated levels of electrical leakage or electrical shorting paths and/or a deletion effect on the strength of the ceramic. Void formation is particularly unforgiving in layers having a thickness of less than 10 microns and must be eliminated.

Another problem that occurs when making aqueous suspensions with ceramic powders of less than 0.5 microns in diameter is that both the interfacial area between the solids and the liquid carrier and the number of particles in a given volume are greatly increased. This results in a high physical chemical interaction between the solid particles in the liquid phase, and diminished processability, especially at commercially acceptable solids loading levels. Hence, often the benefit of finer particle sizes needs to be countered by the necessity of going to lower solids loadings in the suspensions or slips. Manufacturing processes which expose the suspension to high shear conditions, such as those encountered in pumping or tape casting, result in excessive gelling, and in the worst case, unworkable suspensions with shear thickening characteristics and high viscosities. There is a continuing need to solve these problems.

A variety of attempts have been made to prepare finely divided ceramic powders in aqueous suspensions and slips. For example, U.S. Pat. No. 3,496,008 discloses the ball milling of a ferroelectric material such as barium titanate in a 60% by weight solids loading level of milled material to water. The mixed suspension is rediluted to a desirable consistency for spray application. In U.S. Pat. No. 3,551,197 a dielectric composition is prepared with between 40 to 90 weight percent of a ceramic powder in water. The ceramic powder is selected from a group including barium titanate, strontium titanate, calcium titanate, and lead titanate, and has a particle size of 0.5 to 3 micron. The suspended ceramic material is combined with a binder such as polymethylene glycol or diethylene glycol, for example.

In U.S. Pat. No. 4,968,460 an aqueous emulsion of water soluble polymeric binder is combined with an aqueous suspension of ceramic material in a solids loading of at least 50 weight percent. The polymeric binder is used in a range of 0.5 to 35 weight percent and optionally with up to 5 weight percent of a selected dispersing agent. Tapes prepared from the slip composition had a thickness of between 30 microns and 2.540 mm. Particle sizes in the range of 0.5 to 12 micron are disclosed.

These references, however, do not address the problems encountered in the preparation of aqueous suspensions or slips of ceramic powders having very fine particles of less than 0.5 micron in diameter.

A suspension of ceramic powder having a diameter of 0.5 micron or less which remains suspended in an aqueous carrier fluid for extended periods of time in a substantially unagglomerated state and which maintains an apparent viscosity of less than 3000 centipoise (cps) without solidifying when determined from high shear rates of between 50 to 100/sec, would be a desirable improvement in the art of ceramic suspensions, slips, and the processes for producing them. This is achieved in the present process.

In particular, there are two problems to be resolved to enhance the milling of fine ceramic powders: First, control over the state of surface passivation to control the levels of soluble species during milling. Second, control over solution parameters such as pH and dispersant levels. As earlier discussed, many metal oxide powders are prepared by mixing precursor metal oxides or salts followed by calcination to achieve solid state mixing of the metals and oxygen. However, aggregation of the primary particles occurs during the calcination. To reduce the aggregated particles to the primary particle size requires milling.

Milling is a common powder process used in almost all facets of powder industries, including mineral recovery and processing, ceramic and metal powder processing. Application areas for such powders include industries as diverse as cosmetics, herbicides, metals, ceramics, and pharmaceutical powders. However, milling is a relatively energy inefficient process. For example, it has been estimated that only about 1% of the energy input during milling is actually used to comminute the particulate material.

Wet milling in water is the most desirable approach because of greater efficiency in wet milling and lower toxicity and cost of aqueous-based processing schemes. Since milling efficiency is better for low viscosity slurries, additives for wet mill slurries are usually present that act as dispersants and/or modifiers of the particle surface charge. For example, the solution pH is often controlled to avoid the isoelectric point of the powder where there is no net surface charge to provide an electrostatic barrier to agglomeration. Organic dispersants are also typically added to provide viscosity control.

As fracture takes place during milling, the fresh surfaces created react with the solution phase. As milling proceeds and new surface is created, the solution pH can change, and/or the reservoir of dispersant or other additives becomes increasingly depleted due to the reactions at the surface. It is, therefore, a common practice during milling for the mill to be stopped and the pH adjusted or the dispersant level increased to obtain the initial desirable low viscosity in the milling slurry.

For particles greater than about 10 microns in diameter, the actual surface area presented to the solution phase is too small to measurably deplete the solution components, so dramatic equilibrium changes are not a problem. However, for particulates in which the goal of milling is to obtain submicron particles, the large surface areas created during the milling process can appreciably alter the solution chemistry, and one can lose control over the viscosity. Milling rate and efficiency can be diminished as a consequence.

Another issue is in the aqueous milling of water sensitive materials such as Bi modified-ZnO, $BaTiO_3$ and other $A_xB_yO_z$ compounds, non-oxide materials such as aluminum nitride (AlN) and silicon nitride ($Si_3N_4$) and even simple metal oxides such as a-$Al_2O_3$ in which the phase to be milled undergoes undesirable reactions with water. For example, in the case of ZnO, the material usually converts to the thermodynamically stable $Zn(OH)_2$ and the bismuth oxide phase dissolves completely. Therefore, milling of Bi-modified ZnO is generally conducted in more toxic and expensive non-aqueous solvents such as acetone, methylethylketone, or toluene. In the case of $BaTiO_3$, and similar $A_xB_yO_z$ compounds, the $Ba^{2+}$ leaches out of the particle surfaces to form the more thermodynamically stable, but less desirable $BaCO_3$. The $BaCO_3$ and the resulting Ti-rich $BaTiO_3$ surfaces can lead to loss of grain size control critical in preparing capacitors with specific electronic properties. The a-$Al_2O_3$ undergoes surface hydrolysis reactions that also lead to loss of grain size control during subsequent sintering processes. Likewise, manganese zinc ferrites undergo dissolution of the manganese ion and the zinc ion, ultimately leading to loss of grain size control. However, as has recently been shown, many water-sensitive materials can be chemically passivated with simple organic salts. The passivation-dispersion approach, however, has not been applied to materials during milling. It would be expected that as milling proceeds with fresh surface being generated continually requiring passivation that the passivating agent would become rapidly depleted. Thus, passivation would be ineffective in milling operations to produce submicron particles as commonly practiced today. The pH of the suspension also changes with so much new surface continually being exposed.

Accordingly, it is a primary objective of the present invention to make ceramic milling more efficient to produce highly desirable submicron ceramic surfaces, and do so in less time. As an additional benefit, energy consumption is decreased.

An additional objective and result of the present invention is to provide a very thin metal organic salt coating on the ceramic particles which will produce passivation layer minimizing dissolution, and in concert with suitable dispersants, if required, producing a zeta potential which weakens the inherent interparticle attraction. This is effected by dynamic monitoring of the passivating agent during wet milling.

The method of achieving this primary objective as well as others will become apparent from the below-presented detailed description of the preferred embodiment.

SUMMARY OF THE INVENTION

An improved wet milling process for ceramic powders that results in materially-enhanced surfaces on the ceramic powder particles and less energy consumption in the milling process. This is achieved by a process that provides dynamic monitoring solution constituent concentration, passivating agent concentration, and careful control of pH with adjustments as necessary, as the wet milling process is occurring. This dynamic or constant monitoring and real time adjustment during the milling process results in substantially improved ceramic powders.

DETAILED DESCRIPTION OF A PREFERRED EMBODIMENT

Figure 1:
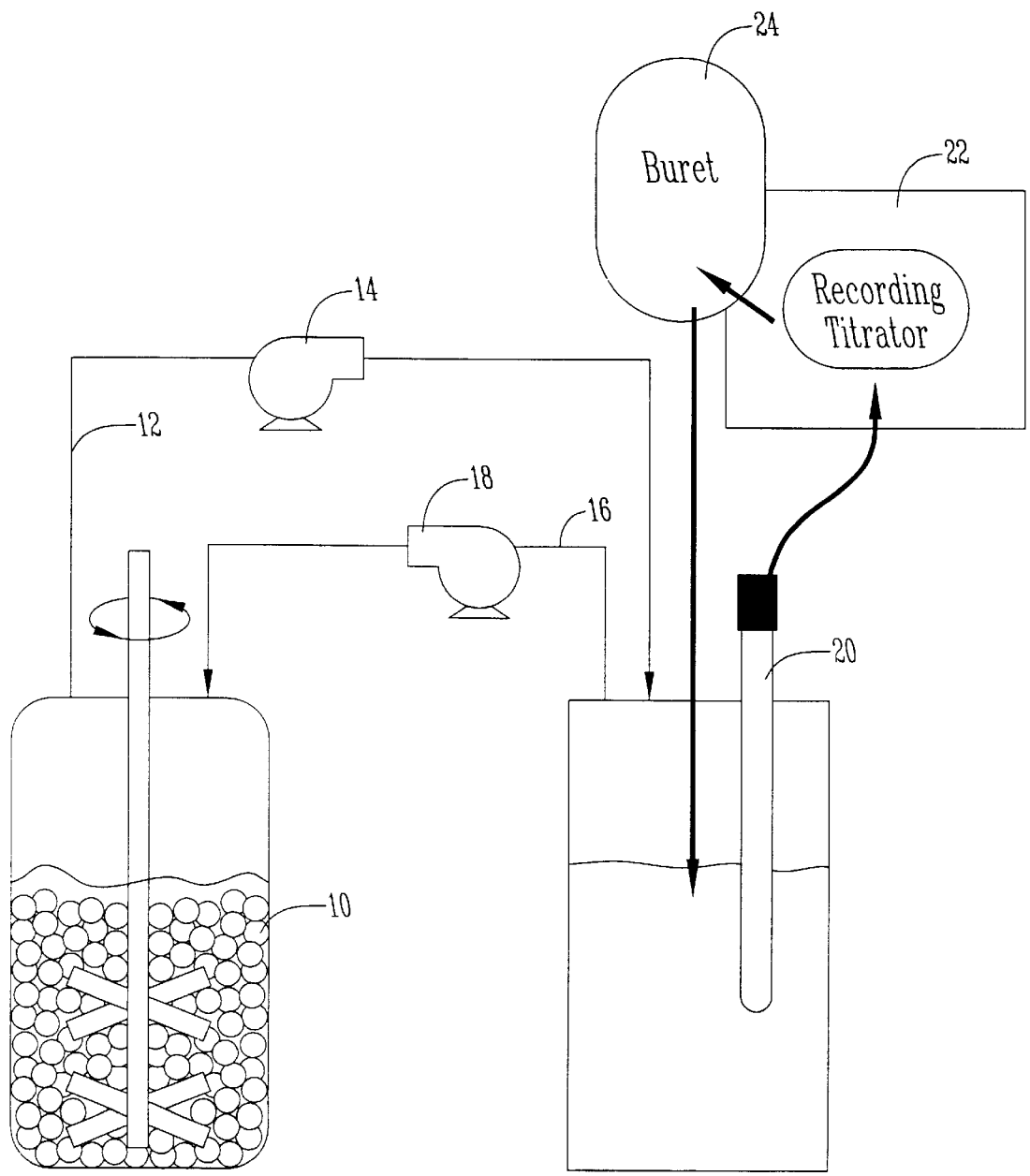
FIG. 1 is a schematic representation of how the dynamic monitoring of a wet milling process can occur.

The term ceramic or ceramic powder as used herein refers to a powder product made by the action of heat on earthy raw materials in which the elements form complex compounds during heating or sintering. They are usually polycrystalline originally formed in aggregates needing milling. The particular ceramic to be treated is non-limiting, and all come within the scope of this invention if, to be useful, they need milling. For example, . . . term ceramic powders include metallic oxides such as zinc oxide, bismuth oxide, or aluminum oxide; metallic sulfides, metallic borides, metallic nitrides, metallic carbides, metallic tellurides, metallic arsenides, metallic silicides, metallic selenides, and metallic halides; and including mixed materials such as metallic titanates, metallic tantalates, metallic zirconates, metallic silicates, metallic germanates, and metallic niobates.

Dispersing agents are, of course, used to maintain the suspension during milling. The passivating agent is to form a coating on the surface of the particle as new surfaces become exposed during the milling process. It results in less disrupted scarred surfaces and smoother surfaces which enhance usefulness of the resulting products made from the ceramic. It is an important feature of the resulting ceramic products of the milling process of this invention that the surfaces are definably different, i.e., less scarring and smoother. This makes the ceramic function better as a component part of, for example, a capacitor.

For the preparation of suspensions and slips containing elevated ceramic powder loading levels in aqueous carrier fluids, there exists a critical concentration range for passivating agents and dispersant, which will result in reduced agglomeration and more uniform pore size distributions in the green layers and green bodies made therefrom. In one embodiment, ceramic compositions for tape fabrication were prepared by uniformly suspending ceramic powder up to about 30 volume percent, and more particularly from 20 to 30 volume percent in an aqueous carrier fluid of deionized water to which the passivating agent had been previously added. The term "uniform" is defined to mean pore sizes of 0.5 microns or less formed in green layers which were prepared from suspensions or slips of the present invention. Prepared suspensions had consistencies of from fluid-like to paste-like, depending on the loading level, of ceramic powder. The dispersant was subsequently added to the mixture to obtain a uniform suspension. The powders that will benefit most from the passivation-dispersion technology and therefore dynamic milling are those powders that display phase instability in the presence of water or those powders with relatively high solubilities or leachability of at least one of the metal components of the ceramic powder between $10^{-4}$ M to $10^{-1}$ M in a pH range of 4 to about 11. Furthermore, powders with an average particle size of 0.5 micron or less and preferably between 0.05 micron and 0.5 micron (and having at least one metal component in the solubility or leachability range noted above) will benefit most from the passivation-dispersion technology and dynamic control of these and pH.

The passivating agent can be any acid, base, salt addition organic or metal organic which (1) bums out cleanly from the suspension or slip at a temperature of about 1050° C. or less, (2) provides a relatively uniform surface charge on the ceramic particles as a function of the carrier fluid pH, (3) has reasonably flat solubility over a pH range of 4 to about 11, (4) forms relatively insoluble precipitates with at least 1 metallic species of the ceramic powder, (5) promotes adsorption of desired anionic or cationic dispersants, and (6) after adsorption of the dispersant, has "improved settling characteristics".

While a number of passivating agents will be known to those skilled in the art, particularly desirable agents may include compounds or mixtures of succinates, benzoates, formates, cupferons, and 8-hydroxyquinoline. Although not wishing to be so limited, oxalic acid is the preferred passivating agent. Preferably, the oxalic acid is dissolved in deionized water at 0.1% to 5% by weight of ceramic powder.

For a ceramic powder loading level of up to 30 volume percent, an optimum passivating agent loading level of 1 to 3 weight percent exists for a quantity of dispersing agent of greater than or equal to 1 weight percent. At lower concentrations of passivating agent, the ceramic powder begins to form agglomerates. At higher concentrations the excess passivating agent in the carrier fluid forms precipitates with dilute metals and dispersants, and apparent viscosity increases to unacceptably high levels, i.e., to greater than 3000 centipoise as determined at 50 to 100/s.

The present invention contemplates that dispersant concentrations of greater than 5% by weight may be used, depending on the passivating agent selected. Dispersing agents preferably include the characteristics of being polymers which are (1) compatible with a ceramic powder particle passivated in the manner discussed above and which uniformly coat the particle; (2) which have trains which stretch in a generally parallel manner across the particle surface rather than extending radially therefrom; (3) which minimize crosslinking or "salting out" in the bulk suspension solution; and (4) which have a zeta potential in excess of +10 millivolts and preferably either in the range of +10 millivolts to about +40 millivolts or of −10 millivolts to about 40 millivolts for the loading levels discussed above. A zeta potential magnitude which is less than +10 millivolts results in a suspension where there is insufficient electrostatic repulsion to prevent particle agglomeration.

Various anionic and cationic surfactants having molecular weight in the range from less than 1000 to greater than 30,000 are contemplated as dispersants. Included are sodium, potassium, or preferably ammonia salts of stearate, lauryl sulfate, alkyl polyphosphate, dodecyl benzene sulfonate, disopropylnaphthalene sulfonate, dioctylsulfosuccinate, ethoxylated and sulfated lauryl alcohol, and ethoxylated and sulfated alkyl phenol.

Various cationic surfactants include polyethyleneimine, ethoxylated fatty amine and stearylbenzyldimethylammonium chloride or nitrate. Alternate dispersants contemplated in the present invention include: polyethylene glycols, lecithin, polyvinyl pyrrolidone, polyoxyethylene, isoctylphenyl ether, polyoxyethylene nonylphenyl ether, amine salts of alkylaryl sulfonates, polyacrylate and related salts, polymethacrylate and related salts, and fish oil. Additional anionic and cationic dispersants having the characteristics described above may be found in the reference entitled McCutcheon's, Volumes 1 and 2, McCutcheon Division, published by The Manufacturing Confectioner Publishing Co.

Dynamic control as used herein refers to monitoring, and, if necessary, adjusting conditions and ingredient concentrations as milling is occurring. For example, to control solution constituents or pH by dynamic monitoring and adjusting during milling. pH control can be via injection of alkaline or acidic solutions (depending on the direction of pH change). This permits one to obtain constant pH during the milling process. The same can be done for passivating agent as concentration levels change with new exposed milled particle surfaces.

FIG. 1 presents a scheme for dynamic control using an automatic titration system in conjunction with an attrition (or mixed media) mill. In addition to specific ion electrodes, optical sensors based upon UV-visible spectroscopy can be used that monitor the level of dispersant and other milling additives so they too can be dynamically controlled. Thus, there are a variety of dynamic monitoring schemes that can be used to monitor and control additives such as dispersant concentrations through a feedback loop to maintain additive levels at constant solution values.

Dynamic monitoring, combined with continual injection of the passivating agent and/or pH regulator via acid and base addition, is required to prevent undesirable reactions of water-sensitive materials during milling. Thus, as seen, essentially the same scheme shown in FIG. 1 can be used to control passivation at milled material surfaces. For example, the oxalate passivation of $Ba^{2+}$ ions that dissolve from the surfaces of barium titanate particles is controlled by the chemical reaction.

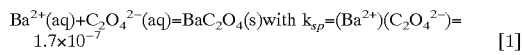

$$Ba^{2+}(aq) + C_2O_4^{2-}(aq) = BaC_2O_4(s) \text{ with } k_{sp} = (Ba^{2+})(C_2O_4^{2-}) = 1.7 \times 10^{-7} \quad [1]$$

where the ( . . . ) indicates the activities of the species in solution. At a given temperature, the solubility product, $k_{sp}$, is a constant. The stoichiometric solubility of $BaC_2O_4(s)$ at 25° C. is ~$4\times10^{-4}$ M over the range from pH 5 to pH 10. Thus, if either the ($Ba^{2+}$) or ($C_2O_4^{2-}$) is monitored, control over the concentration of $Ba^{2+}(aq)$ can be obtained by injection of $C_2O_4^{2-}(aq)$ via a titration system. While specific ion electrodes for divalent species such as $Ba^{2+}(aq)$ are readily available, monitoring $C_2O_4^{2-}(aq)$ requires an enzyme-based electrode system that is not commercially available and must be built.

The following examples are offered to further illustrate dynamic control of pH during wet milling of ceramic powders. It should be understood that various modifications can be made within the illustrated embodiments and still come within the scope of the invention.

EXAMPLE 1 $(Mn,Zn,Fe)Fe_2O_4$

This is an example of the preparation and milling of a ~72.2 wt% (~30.7 vol%) $(Mn,Zn,Fe)Fe_2O_4$ suspension (350.0 g $(Mn,Zn,Fe)Fe_2O_4$ powder, 134.5 g total deionized water) for the invention.

The preparation involves the following steps: addition of the passivating agent(s), addition of the dispersing agent(s), addition of the powder of interest, pH control and milling.

The agent(s) additives are calculated with respect to the weight of the dry powder and are referred to as w/w from now on to designate weight percent with respect to the dry powder.

This example contains 2.0 w/w passivating agent and 3.0 w/w dispersing agent. The passivating agent in this example is oxalic acid and is added in the form of oxalic acid dihydrate ($H_2C_2O_4 \cdot 2H_2O$), source: Aldrich Chemicals. Oxalic acid dihydrate is composed of oxalic acid and water (71.4% oxalic acid and 28.6% water). The calculation should only account for the passivating agent, oxalic acid, and the water from the dihydrate should be subtracted from the total deionized water.

The dispersing agent in this example is polyethyleneimine, MW 25,000 and is added from a 33.3 wt.% aqueous stock solution. Polyethyleneimine is stirred with deionized water to produce a 33.3 wt% stock solution. Example, 50 g polyethyleneimine stirred into 100 g of deionized water. The water added from the stock solution should also be subtracted from the total deionized water.

In this example, 350.0 g $(Mn,Zn,Fe)Fe_2O_4$, the amount of oxalic acid added, is 7.0 g (9.8 g in the dihydrate form), and the amount of polyethyleneimine is 10.5 g (31.5 g in the stock solution form). The amount of deionized water added is 110.7 g, and the total amount of deionized water, accounting for the additions from the passivating agent and dispersing agent, is 134.5 g.

In a Nalgene® beaker on a stir plate, polyethyleneimine is added to deionized water to prepare the dispersing agent stock solution (50.0 g polyethyleneimine and 100.0 g deionized water). A magnetic stir bar is used to stir the solution. This solution is prepared a minimum of 24 hours in advance to ensure a homogeneous solution.

To prepare the suspension, deionized water (11.5 g) is weighed into a Nalgene® beaker, and oxalic acid dihydrate (9.8 g) is added in. A magnetic stir bar and stir plate is used to dissolve the passivating agent, oxalic acid. Once dissolved, the dispersing agent in the stock solution form is added (31.5 g polyethyleneimine stock solution). Half of the powder (175.0 g of $(Mn,Zn,Fe)Fe_2O_4$) is slowly added into the suspension and allowed to mix for five minutes. At this point, the suspension pH is measured using an ISFET pH electrode (source: SENTRON, Integrated Sensor Tech. Inc.). The suspension pH is adjusted so that the suspension pH is between pH 4.5 and pH 8.0. In this example, 5 ml of a 5M $HNO_3$ (nitric acid) solution was added into the suspension, and the suspension pH was pH 7.7. The other half of the powder was added later on, in the mill.

The suspension was milled by attrition milling. A plastic shaft with plastic arms was used, and the mill tank was 750 ml and made of stainless steel (source: Union Process). Once the shaft and tank was attached to the mill (source: Union Process), the tank was filled with ~2100 g of ~3/16" (~5 mm) stainless steel milling media. At this point, the milling run started.

To start the milling run, the mill was operated at 250 rpm, and the slurry prepared was poured into the mill vessel. The other half of the powder (175.0 g) was slowly added to the mill vessel. Once all of the powder was in the vessel, the mill was operated at 490 rpm. The suspension was milled for 4 hours and the pH was measured at different time intervals. If the suspension pH was not in the range of pH 7.0 to pH 8.5, either 5.0M nitric acid ($HNO_3$) or 2.4M tetraethylammonium hydroxide (TEAOH) was used to adjust the pH. Samples were extracted from the mill at 15, 30, 60, 120 and 240 minutes. In this example, 2 ml of a 5M $HNO_3$ solution was added after 120 minutes of milling.

As a figure of merit, the average agglomeration number (AAN) is used. As defined in the National Institute of Standards and Testing (NIST) Publication 945, the AAN is the average number of primary particles contained within an agglomerate. It was calculated from the ratio of the volume of the median particle size determined by a light scattering technique to the average equivalent spherical volume given by the BET gas adsorption method. This is shown in equation (1).

$$AAN = \frac{V_{d_{50}}}{V_{BET}} = \left[(d_{50}) \cdot \frac{p \cdot SSA}{6}\right]^3 \quad (1)$$

Figure 2:
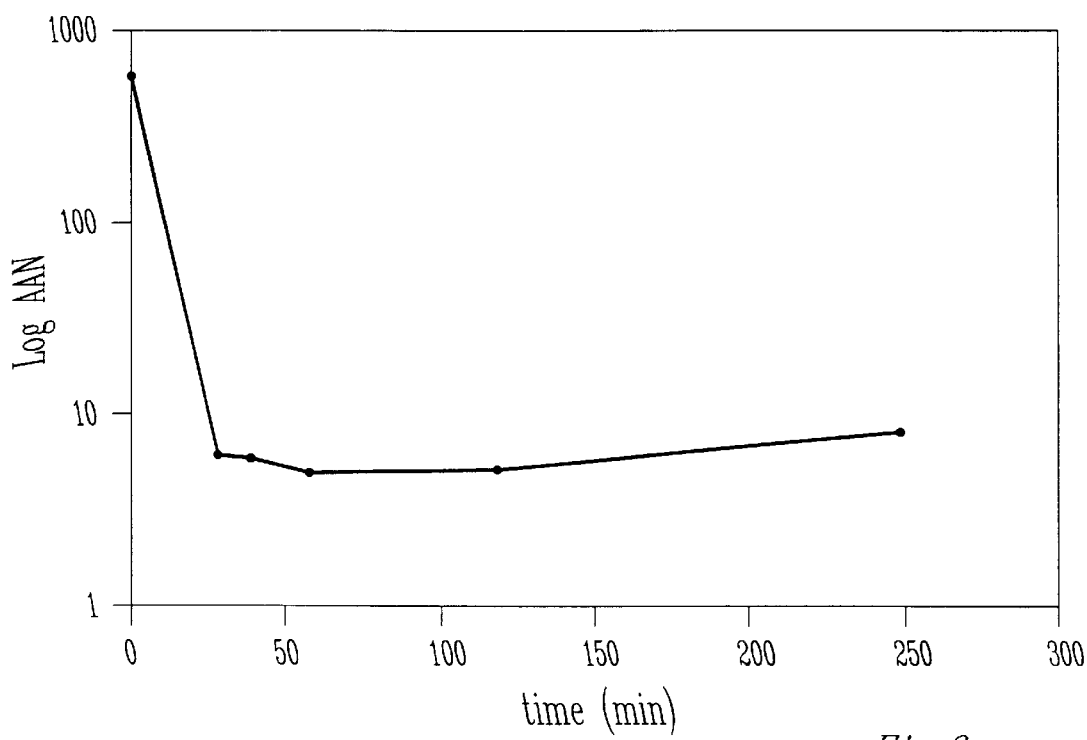
FIGS. 2 and 3 compare the chemically aided milling of the invention with typical milling as explained in Example 1.

As shown in FIG. 2, the AAN decreases approximately 3 orders of magnitude, i.e. ~1000 to ~6 in 240 minutes (4 hrs.). This indicates that milling efficiency is enhanced by the dynamic passivation/dispersion during the chemically aided milling approach.

An alternative milling approach typically used in industry is to use ~0.5–2 w/w of a dispersant. An example of a typical dispersant used for ferrite materials is LOMAR, which is based on a naphthalene sulfonated condensate. To compare the results from example 1, a 75.2 wt% (33.4 vol%) (Mn, Zn,Fe)$Fe_2O_4$ suspension (350.0 g (Mn,Zn,Fe)$Fe_2O_4$ powder, 115.1 g total deionized water) was prepared in a similar fashion as example 1. In this case, 1 w/w of LOMAR was used. LOMAR contains ~45% "active ingredient" and was accounted for in the calculation, i.e. ~7.8 g LOMAR (~3.5 g "active ingredient"). The dispersant was added to the deionized water (110.8 g), and approximately half of the powder (175.0 g) was added in to prepare the slurry. To start the milling run, the mill was operated at 250 rpm and the slurry prepared was poured into the mill vessel. The other half of the powder (175.0 g) was slowly added to the mill vessel. Once all of the powder was in the vessel, the mill was operated at 490 rpm. The suspension was milled for 4 hours. Samples were extracted from the mill at 15, 30, 60, 120 and 240 minutes.

Figure 3:
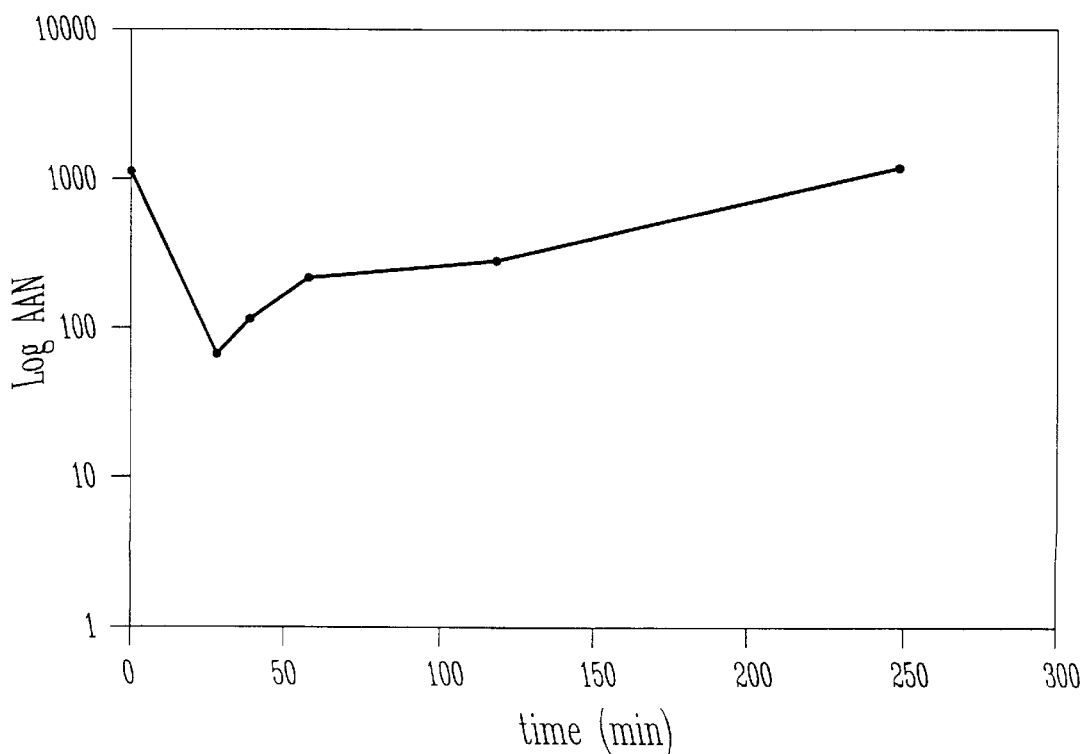

FIG. 3 shows the AAN vs. time plot for the alternative milling approach. In this case, AAN initially decreases by ~1 order of magnitude, but gradually increases to approximately the same AAN in the initial slurry, indicating a re-agglomeration process. As shown in the figures, the invention shows a large improvement in milling over time.

As used in this example and as shown in the drawing, FIG. 1 illustrates a schematic of how chemically aided milling using constant real time monitoring of pH, followed by as necessary addition of acid or base, can be used to enhance the milling. The suspension 10 is being milled. It is connected via a sampling tube 12 and pump 14 and a return sampling tube 16 and pump 18 to a pH selective electrode 20. Material is removed from the suspension 10 and pumped to electrode monitor 20, which continuously reads pH. The pH or given ion, as then monitored, sends a signal to the automatic titrator 22 which is connected to a buret 24 that provides the appropriate reagent (e.g., $H^+$ or $OH^-$) so that pH is maintained constant during milling. Thus, based on the readings buret 24 is used for pH or ion adjustment. In particular, monitoring of hydrogen ion concentration or other specific ions is constantly being determined. Any changes sensed as necessary by the electrode arrangement sends a signal to the automatic titrator 22 coupled to buret 24 that provides an appropriate reagent (e.g. $H^+$ or OH) so that the pH or selected ion is maintained at a constant value during milling.

The illustration of FIG. 1 shows only one electrode, but multiple electrodes and burets could easily be accommodated and often would be used. Surfactant electrodes and/or optical fiber sensors could also be used to monitor and control dispersant levels during the milling process.

EXAMPLE 2 $BaTiO_3$

This is an example of the preparation and milling of a ~71.3 wt% (~30.0 vol%) calcined $BaTiO_3$ suspension (504.5 g $BaTiO_3$ powder, 189.4 g total deionized water) for the invention.

The preparation involves the following steps: addition of the passivating agent(s), addition of the dispersing agent(s), addition of the powder of interest, pH control and milling.

The agent(s) additives are calculated with respect to the weight of the dry powder and are referred to as w/w from now on to designate weight percent with respect to the dry powder.

This example contains 2.1 w/w passivating agent and 1.0 w/w dispersing agent. The passivating agent in this example is oxalic acid and is added in the form of oxalic acid dihydrate ($H_2C_2O_4 \cdot 2H_2O$), source: Aldrich Chemicals. Oxalic acid dihydrate is composed of oxalic acid and water (71.4% oxalic acid and 28.6% water). The calculation should only account for the passivating agent, oxalic acid, and the water from the dihydrate should be subtracted from the total deionized water.

The dispersing agent in this example is polyethyleneimine, $MW_{avg}$ 50–60,000 and is added in the form of the as-received 50 wt% aqueous solution.

In this example, 504.5 g $BaTiO_3$, the amount of oxalic acid added, is 10.8 g (15.2 g in the dihydrate form), and the amount of polyethyleneimine is 5.07 g (10.14 g in the solution form). The amount of deionized water added is 180.0 g, and the total amount of deionized water, accounting for the additions from the passivating agent and dispersing agent, is 189.4 g.

To prepare the suspension, deionized water (180.0 g) is weighed into a Nalgene(®) beaker, and oxalic acid dihydrate (15.2 g) is added in. A magnetic stir bar and stir plate is used to dissolve the passivating agent, oxalic acid. Once dissolved, the dispersing agent in the stock solution form is added (10.14 g polyethyleneimine solution). Approximately onethird of the powder (170.0 g of $BaTiO_3$) is slowly added into the suspension and allowed to mix for several minutes. At this point, the suspension pH is measured using an ISFET pH electrode (source: SENTRON, Integrated Sensor Tech. Inc.). The suspension pH is adjusted so that the suspension pH is between pH 4.5 and pH 8.0. In this example, there was no pH adjustment necessary, and the initial suspension pH was pH 4.6. The other two-thirds of the powder was added later on, in the mill.

The suspension was milled by attrition milling. A plastic shaft with plastic arms was used, and the mill tank was 750 ml and made of stainless steel (source: Union Process). Once the shaft and tank was attached to the mill (source: Union Process), the tank was filled with ~1500 g of ~3/16" (~5 mm) yttria stabilized zirconia milling media. At this point, the milling run started.

To start the milling run, the mill was operated at 250 rpm, and the slurry prepared was poured into the mill vessel. The other two-thirds of the powder (334.5 g) was slowly added to the mill vessel. Once all of the powder was in the vessel, the mill was operated at 490 rpm. The suspension was milled for 2 hours, and the pH was measured at the different time intervals.

Figure 4:
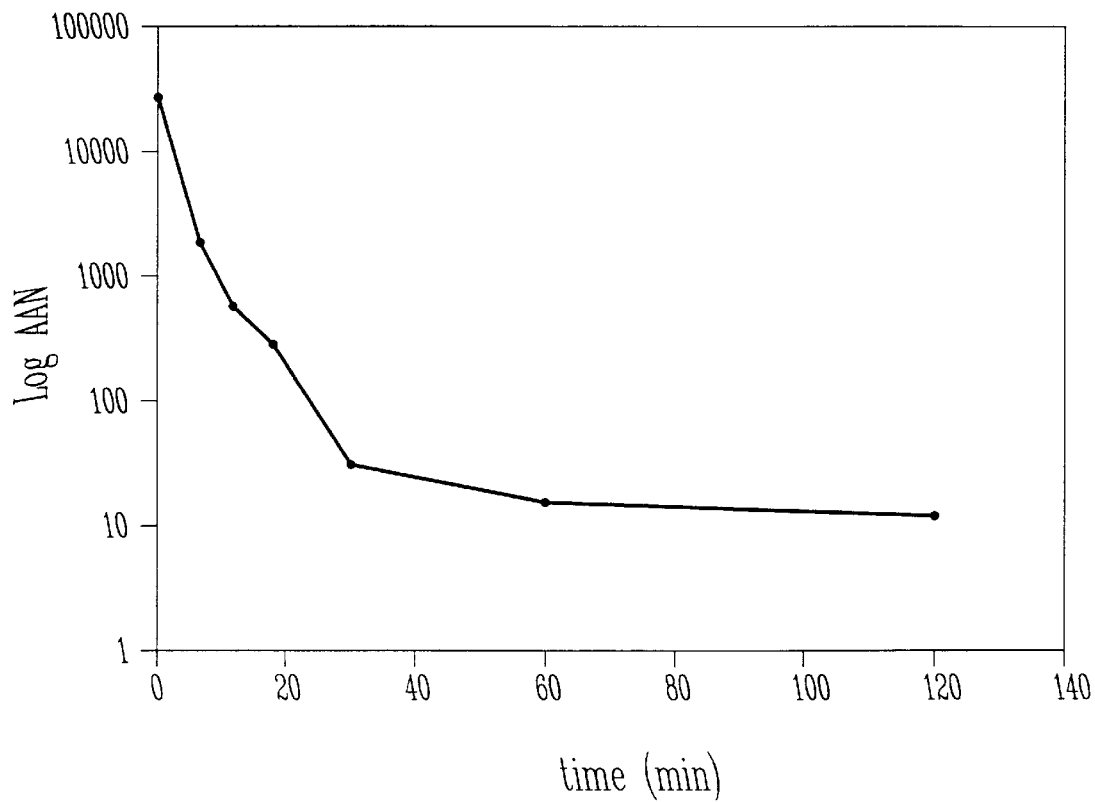
FIG. 4 shows chemically aided milling of $BaTiO_3$ of Example 2.

As shown in FIG. 4, the AAN decreases approximately 3 orders of magnitude, i.e. ~22000 to ~13 in 120 minutes (2 hrs.). This indicates that milling efficiency is enhanced by the dynamic passivation/dispersion during the chemically aided milling approach.

It can therefore be seen that the invention accomplishes at least all of its stated objectives.

What is claimed is:

1. The method of wet milling ceramic powders comprising:

preparing a carrier suspension of a ceramic powder;

adding a dispersing agent and a passivating agent to the carrier suspension of the ceramic powder;

milling the carrier suspension while continuously monitoring the pH of the carrier suspension; and adding acid or base as needed to keep the pH within a desired range during milling.

2. The method of claim 1 wherein the carrier suspension of the ceramic powder is an aqueous suspension of the ceramic powder.

3. The method of claim 2 wherein the aqueous suspension has a ceramic powder loading of up to about 30% by volume.

4. The aqueous suspension of claim 2 wherein the suspension has apparent viscosity of less than 3000 cps determined at shear rates between 50 to 100/sec.

5. The aqueous suspension of claim 2 wherein the amount of passivating agent is sufficient to provide a thin layer of relatively insoluble passive agent coating on the suspended particles in an amount ranging of from 0.5% to 5.0% by weight of the ceramic powder.

6. The method of claim 5 wherein the passivating agent is selected from the group consisting of succinates, benzoates, formates, cupferrons, 8-hydroxyquinoline, oxalic acid, and mixtures thereof.

7. The method of claim 1 wherein milling occurs until the particles have an average particle size of less than 0.5 microns in diameter.

8. The method of claim 1 wherein the dispersing agent is added to the suspension in an amount of at least 1% by weight of the ceramic powder.

9. The method of claim 1 wherein the ceramic powder's concentration in the suspension is from $10^{-4}$ M to $10^{31\ 1}$ M.

10. The method of claim 1 wherein the pH is monitored within the range of 4–11.

11. The method of claim 1 wherein the passivating agent is loaded at a level of from 1% to 3% by weight of the ceramic powder.

12. The method of claim 1 wherein the dispersing agent is selected from the group consisting of anionic and cationic surfactants having a molecular weight in the range of from about 1000 to 30,000.

13. The method of claim 12 wherein the dispersant is an anionic dispersant.

14. The method of claim 12 wherein the dispersant is a cationic surfactant.

15. The method of claim 12 wherein the dispersant is selected from the group consisting of sodium, potassium, and/or ammonia salts of stearate, lauryl sulfate, alkyl polyphosphate, dodecyl benzene sulfonate, disopropylnaphthalene sulfonate, dioctylsulfosuccinate, ethoxylated and sulfated lauryl alcohol, and ethoxylated and sulfated alkyl phenol.

16. The method of claim 12 wherein the surfactant is a cationic surfactant selected from the group consisting of polyethyleneimine, ethoxylated fatty amine, stearylbenzyldimethylammonium chloride or nitrate.

17. The method of claim 12 wherein the pH of the suspension is maintained between 7 and 10.

18. The method of claim 1 wherein passivating agent concentration is also continuously monitored and maintained within a desired range as milling exposes new ceramic powder surfaces to the passivating agent.

* * * * *